UNITED STATES PATENT OFFICE.

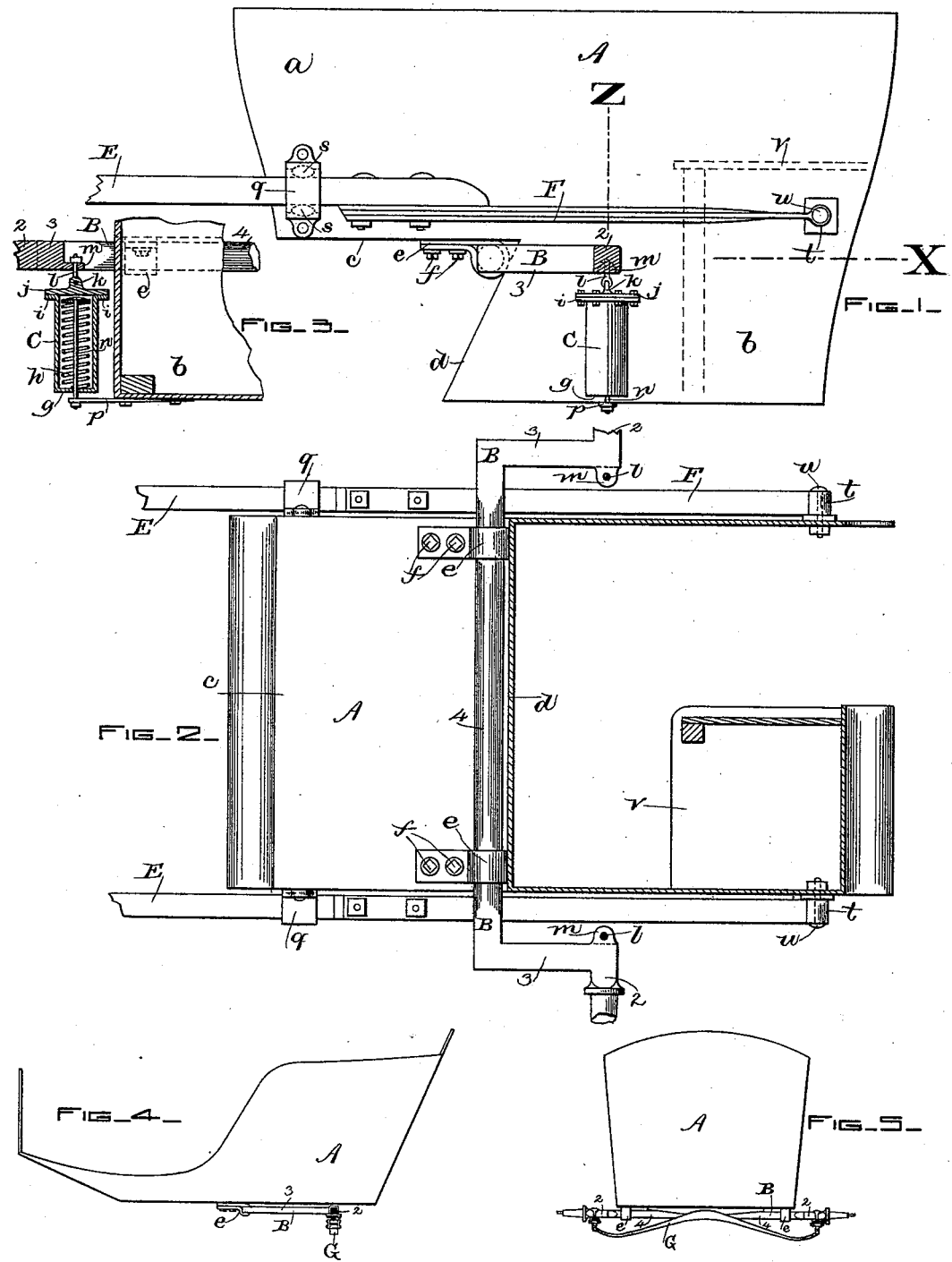
(No Model.)
J. T. CLARKSON.
CARRIAGE.
No. 392,854. Patented Nov. 13, 1888.
WITNESSES
INVENTOR

JOSEPH T. CLARKSON, OF AMESBURY, MASSACHUSETTS.

CARRIAGE.

SPECIFICATION forming part of Letters Patent No. 392,854, dated November 13, 1888.

Application filed July 31, 1888. Serial No. 281,582. (No model.)

*To all whom it may concern:*

Be it known that I, JOSEPH T. CLARKSON, of Amesbury, in the county of Essex and State of Massachusetts, have invented a new and useful Improvement in Carriages, which will, in connection with the accompanying drawings, be hereinafter fully described, and specifically defined in the appended claims.

In the drawings, Figure 1 is a side elevation of a carriage embodying my improvement, the wheels being omitted and the forward part of the shafts broken away. Fig. 2 is a sectional plan view, the section being taken on line X, Fig. 1, and the view as from below that line. Fig. 3 is a detached sectional elevation, the section being taken on line Z, Fig. 1, and the elevation as viewed from the right therein. Fig. 4 is a view similar to Fig. 1, but showing a body of different construction. Fig. 5 is a rear elevation taken at the right of Fig. 4.

This invention relates more especially to that class of two-wheeled carriages in which a "crank-axle," so called, may be employed, all five of whose members are arranged in the same horizontal or nearly horizontal plane; and it consists in the features of novelty which will be hereinafter described, and pointed out in the claims.

Referring again to said drawings, A represents the body, which, as shown in Figs. 1, 2, and 3, is cut away—that is, the front portion, $a$, is of less depth than the rear portion, $b$, said front portion having its bottom at $c$, while line $d$ bounds the portion $b$ at its front, said lines $c\, d$ preferably constituting an acute angle, as shown in Fig. 1, thus giving more room for extending the feet and legs of the occupants. The seat $v$, which is for one person, is shown by dotted lines in Fig. 1 and in plan in Fig. 2, and is arranged at one side of the body, while the balance of the width of the body furnishes space for entrance and exit.

The axle is shown at B and is of the well-known crank-axle pattern, having the members 2 2, on which the wheels are secured, and the members 3 3, extended forward and connected by member 4, that passes under the body near the intersection of lines $c\, d$, and is thereto secured by bearings $e\, e$, fastened to the sill or bottom by bolts $f$, said bearings being preferably formed of hard leather, green hide, or other durable non-metallic material to avoid rattling or noise.

To elastically support the body at or near the line of the axis of the wheels, I preferably employ a cylinder, C, having a rigid bottom, $g$, on which is seated a coiled spring, $h$, said cylinder being supported by means of its flange $i$, bolted, as shown, to cover $j$, having an eye, $k$, in which is inserted an eyebolt, $l$, that passes loosely through and is secured in eye $m$, formed upon the axle, the body being connected with said spring by a broad-headed rod, $n$, that passes down through the spring and through a central opening in bottom $g$, and also through body-hanger $p$, to which it is secured, the head of said rod $n$ being seated upon the top coils of the spring.

I secure the shafts E to the body by passing them through a bracket or holder, $q$, secured to the side of the body near its front end, buffers $s$, of rubber or other cushioning material, being secured to said holder to bear against the top and bottom sides of the shafts. To the rear ends of the shafts I secure the laminated arm-spring F, formed at its rear end with an eye, $t$, by which it is pivotally secured to the body by bolt $u$. Instead of employing the coiled spring shown in Figs. 1 and 2, a cross-spring, G, Figs. 4 and 5, may be employed, its ends being shackled to the members 2 of the axle. When this class of spring is thus employed, the body will not be of the cut-away pattern, but practically as shown in Figs. 3 and 4, as no part of it can practically extend below the general plane of the axle.

I am aware that shafts have been provided with an arm-spring attached to the body in the manner shown, and that it is also common to arrange the cranked axle in a horizontal plane, or nearly so; but I am, I believe, the first to pivotally connect the central member, 4, of a cranked axle with a body of any style or kind, and also the first to secure a cranked axle in a horizontal plane by supporting said central member from the body, and also the first to thus combine the body and axle and also attach the shafts to the body, and the first to thus connect the central member of the axle and the body and also support the body from the rear portion of the axle by an elastic connection; and I believe that I am the first to construct a body as shown—that is, cut away at the lower front—such cut-away portion being bounded by lines c d, thus leaving the drop rear portion, b, and the upper extension, a, and having a half rear panel and an entrance to the seat at the opposite side of the rear.

I do not confine myself to the class or kind of springs shown, as other kinds may, with greater or less success, be employed in lieu thereof, and a crank-axle may be employed in a four-wheeled vehicle in the manner shown in the drawings; hence in the manner of connecting the body and axle I do not limit myself to two-wheeled vehicles.

By pivoting the central member, 4, of the axle to the body the latter may be as low hung as is preferred, it being evident that when the axle is arranged in a vertical plane the "drop" of the axle must limit the low hanging of the body; but when the axle is arranged as shown part b of the body may be arranged as low as desired. Besides this, when four-wheeled vehicles—such as buckboards—are provided with crank-axles arranged in a horizontal plane with elastic supports at the axis of the wheels, the front portion of the platform will have a free vertical movement as well as the central portion; and with the central portion of the axle thus pivotally connected with the body the shafts may also be attached to the body, while the latter is suspended by a spring from the axle, instead of being supported upon platform-springs that serve to hold the body and axle in proper relative position, for my pivotal connection of member 4 with the body serves effectually to hold the latter and the axle in proper relation to each other.

I claim as my invention—

1. A cranked axle arranged in a horizontal plane, or nearly so, and at its central portion pivotally connected with the body, substantially as specified.

2. A cranked axle having its central member extended forward of the axial members 2 and connected with and supported by the body, substantially as specified.

3. A cranked axle having its central member pivotally connected with the body and an elastic spring-connection between the rear portion of the axle and the body for the support of the latter, substantially as specified.

4. The combination of a cranked axle, a body, and the shafts, the axle being arranged with its members in a horizontal plane, or nearly so, and at its central member pivotally connected with the body, and at or near the axis of the wheels connected with the body by elastic connections, and the shafts connected with the body, all substantially as specified.

5. The combination of a cranked axle arranged in a horizontal plane, or nearly so, and a cut-away body having the rear drop portion, b, the front upper extension, a, and a rear entrance, all substantially as specified.

6. The combination of the body, the shaft, the rear arm-spring, F, pivotally connected with the body, and bracket q, provided with cushions s s, substantially as specified.

7. The combination of body A, the axle B, pivotally connected with the body by its member 4, and also connected with the body by springs in rear of said pivotal connection, and shafts E, engaged in holders q, and provided with a rear arm-spring pivotally connected with the body at its rear end, substantially as specified.

JOSEPH T. CLARKSON.

Witnesses:
FRANK R. WHITAKER,
GEORGE H. BRIGGS.